March 30, 1965   C. VOREAUX ETAL   3,175,570
HYDROSTATIC TRANSMISSION SYSTEM FOR VEHICLES
Filed April 15, 1960   2 Sheets-Sheet 2
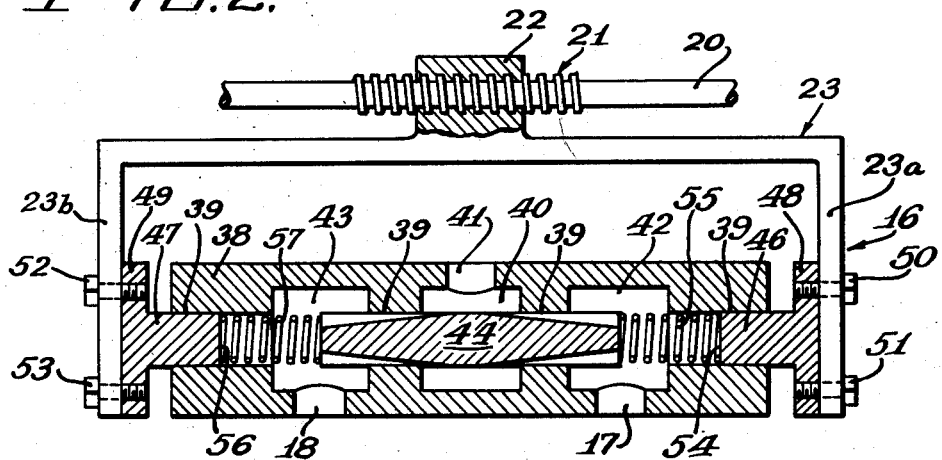
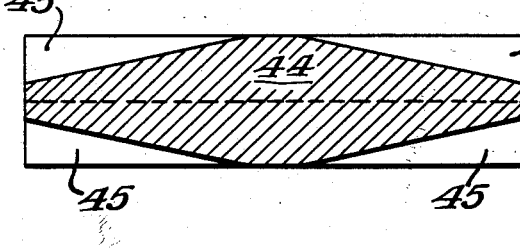
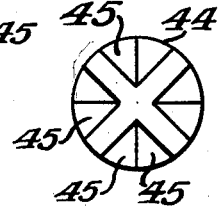
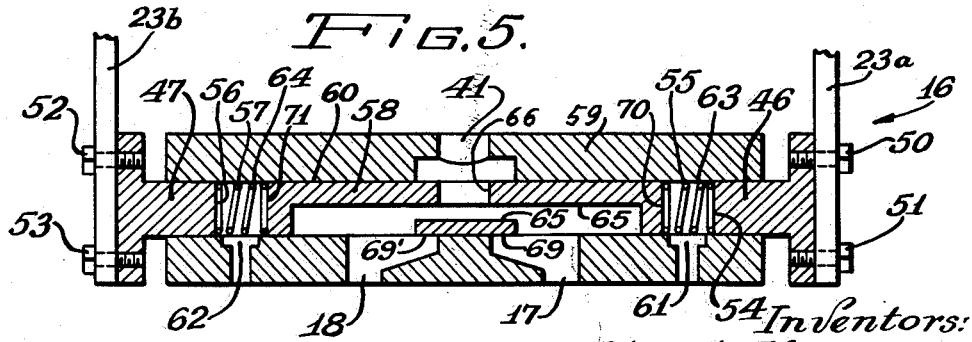
Inventors:
Claude Voreaux
Jean-Pierre Joyeux
Fernand Copié

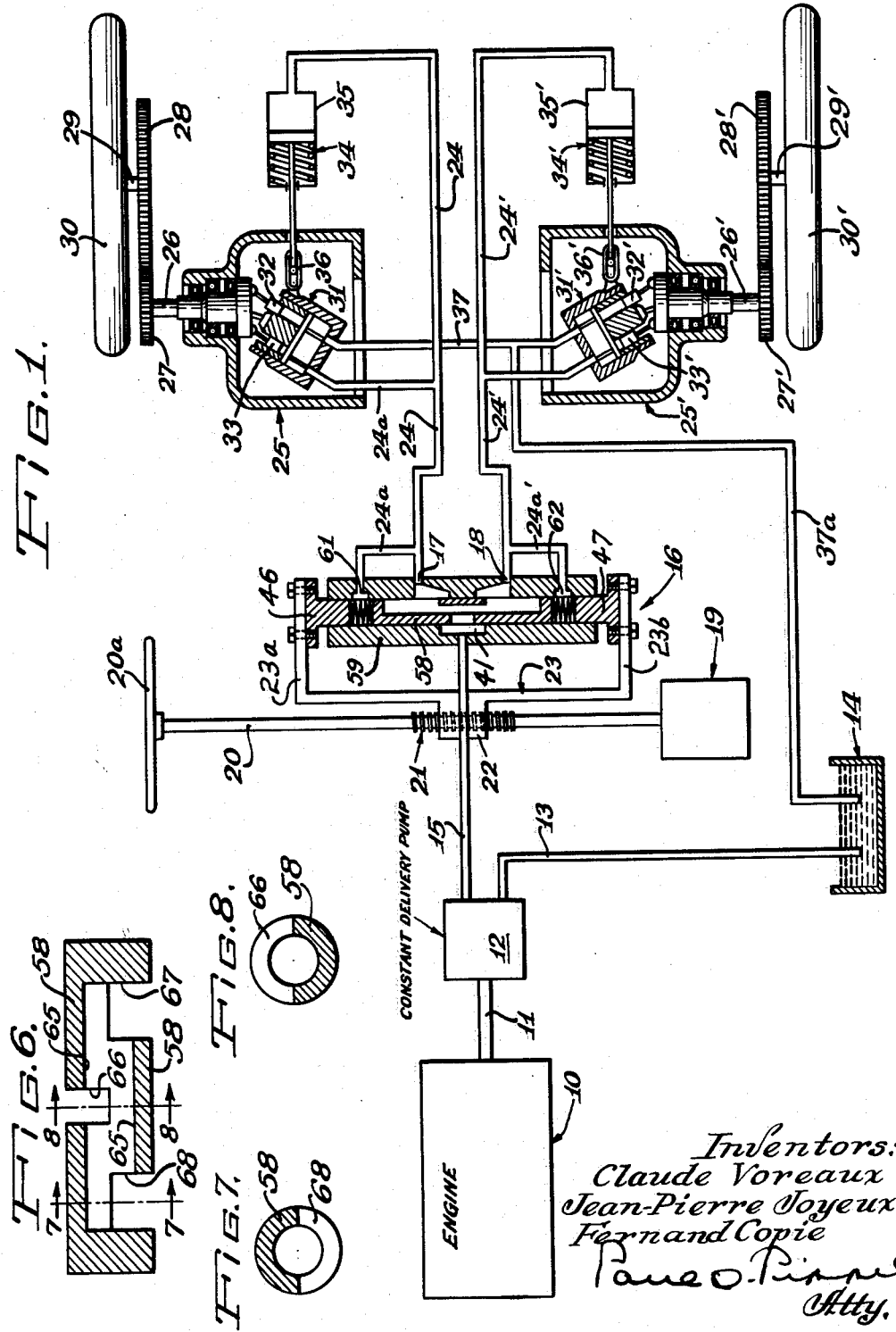

United States Patent Office 3,175,570
Patented Mar. 30, 1965

3,175,570
HYDROSTATIC TRANSMISSION SYSTEM
FOR VEHICLES
Claude Voreaux, Saint-Cloud, and Jean-Pierre Joyeux
and Fernand Copie, Saint-Dizier, France, assignors to
International Harvester Company, a corporation of
New Jersey
Filed Apr. 15, 1960, Ser. No. 22,614
Claims priority, application France, Apr. 22, 1959,
792,864
1 Claim. (Cl. 137—101)

The present invention relates to a variable speed hydrostatic transmission system for vehicles. More in particular this invention relates to a hydrostatic transmission system having a fluid distributor valve for governing two rotary type fluid motors whereby both motors operate selectively at equal speed or unequal speed without substantial effect due to varying torque delivery requirements on either one or both motors.

For example when a conventional vehicle, such as a wheel type agricultural tractor, moves on a level highway the speed may be controlled by its engine speed and the torque requirements of both ground engaging wheels are substantially equal to each other. However, when the same tractor is operating an implement, such as a plow, the torque requirements of each of its two driving wheels will vary quite widely. For example if one driving wheel engages ice or mire, the speed of that wheel will tend to increase because of the decreased torque requirement. The present invention circumvents this problem by maintaining the speed of both wheels substantially the same but automatically varying the torque. Thus in accordance with the present invention the driving wheel on ice or mire would undergo a torque reduction while the other driving wheel would have an increased torque delivery automatically but at the same time maintaining the speeds of the wheels equal. Also when it is desired to vary the speed of one driving wheel with respect to the other driving wheel, such as in turning or steering movement, the invention contemplates means for accomplishing this result selectively.

It is a prime object of this invention to provide automatic means for fluid under pressure distribution from a constant delivery source, in a hydrostatic driven vehicle, to two fluid motors whereby both motors operate at substantially equal speed irrespective of varying torque load imposed on one motor with respect to the other motor.

A further important object of this invention is to provide automatic means for fluid under pressure distribution from a constant delivery source, in a hydrostatic driven vehicle, to two fluid motors whereby both motors operate at selectively unequal speed ratio irrespective of varying torque load imposed on one motor with respect to the other motor.

Another important object of the invention is to provide a fluid pressure responsive distributor valve mechanism for proportioning the flow of fluid under pressure from a constant delivery source to two fluid motors whereby the fluid motor having the higher torque load receives a proportionate increased flow of fluid and the other motor receives corresponding proportionate decreased flow of fluid and maintaining both motors at substantially equal speeds.

Still another important object of the invention is to provide a fluid pressure responsive distributor valve for selectively proportioning the flow of fluid under pressure from a constant delivery source whereby the speed and torque load of one motor may be varied with respect to that of the other motor.

These and other desirable and important objects inherent in and encompassed by the invention will be more readily understood from the ensuing description, the appended claim and the annexed drawings wherein:

FIGURE 1 is schematic in part and sectional views of components for a vehicle, such as a tractor, illustrating the hydraulic circuits of an embodiment of this invention.

FIGURE 2 is an enlarged sectional view of one embodiment of the pressure responsive fluid distributor valve of this invention including means for selectively controlling the fluid flow distribution therethrough.

FIGURE 3 is a sectional view of the slidable valve plunger of FIGURE 2.

FIGURE 4 is an end view of the valve plunger of FIGURE 3 illustrating constructional details not apparent from FIGURE 3.

FIGURE 5 is an enlarged sectional view of an alternate form of the distributor valve of this invention wherein the actuation of the valve plunger is by means of closed pressure chambers whereby movement thereof is substantially unaffected by momentum of inertia of the fluid flowing through the outlet motor ports.

FIGURE 6 is an enlarged sectional view of the valve plunger of FIGURE 5 illustrating construction details thereof.

FIGURE 7 is a side elevation, in section, taken on line 7—7 of FIGURE 6 illustrating further construction details of one fluid outlet port means in the plunger of FIGURE 6.

FIGURE 8 is a side elevation, in section, taken on line 8—8 of FIGURE 6 illustrating further construction details of the fluid inlet port means in the plunger of FIGURE 6.

FIGURE 1 indicates the hydrostatic power transmission for propelling a vehicle, such as a tractor, having a conventional power plant 10. The power plant 10 may conveniently be comprised of an ordinary internal combustion engine such as a diesel or gasoline type engine. The power plant 10 is provided with the usual rotatable drive shaft 11 connected to a fluid pump 12 of the constant delivery type. However, for purpose of this invention it will become apparent that a pump of the variable delivery type may alternatively be employed.

The pump 12 is provided with an inlet conduit 13 leading to a sump or fluid reservoir 14 from which the pump draws its source of fluid. The pump 12 is also provided with a fluid under pressure discharge conduit 15. Thus the conduit 15 represents the source of delivery of fluid under pressure employed in this invention.

The numeral 16 indicates an automatic fluid flow distributor or divider which functions to respond to a pressure differential occurring between its first and second fluid motor ports 17 and 18 respectively. At 19 is indicated a conventional steering mechanism with the usual steering column 20 and operator's manual steering wheel 20a. In a wheel type vehicle the steering mechanism 19 governs the steering movement of the forward wheels (not shown) in a conventional manner. The steering column 20, however, is provided with a threaded portion 21 with a running nut 22, which nut is an integral part of a bracket indicated at 23.

The first fluid motor port 17 of the distributor valve 16 is communicatively connected by the conduits 24 and 24a to a variable piston stroke first motor generally indicated at 25. The motor 25 is of conventional construction such as, for example, the type shown and described in U.S. Patent No. 2,487,617 to R. L. Tweedale. The motor 25 is provided with a rotatable output shaft 26 connected to a pinion gear 27. The pinion 27 in turn is in meshed relation with large gear 28. The gear 28 is connected in drive relation through shaft 29 to a vehicle ground engaging wheel 30 such as, for example, a rear drive wheel of a tractor.

The means for varying the piston stroke and thus its fluid displacement of the motor 25 is by shifting the angular displacement of the composite unit indicated at 31 with reference to the rotational axis of the shaft 26. Thus as the angular displacement of the unit 31 with respect to the axis of rotation of shaft 31 approaches alinement with each other the fluid displacement of the motor 25 diminishes because the piston stroke of the pistons, two of which are shown at 32 and 33, are shortened. From this it can be seen that for a constant flow of fluid under pressure through the conduit 24a the speed of the output shaft 26 will increase as the stroke of the pistons is shortened through corresponding reduction in angular displacement of the axis of unit 31 with respect to the axis of shaft 26. Theoretically at least when the unit 31 is alined with shaft 26 the speed of shaft 26 would be infinite at zero torque and the flow of fluid under pressure into the motor 25 is zero. For practical purposes, of course, the fluid motor 25 is provided with stop means (not shown) for limiting the angular movement of the unit 31. The means for controlling the fluid displacement of the motor 25 by shifting the angular displacement of the unit 31 is a servo-mechanism indicated at 34 which is actuated by the fluid under pressure in conduit 24. The construction and operation of the servo-mechanism 34 is fully described in copending application of Claude Voreaux and Jean-Pierre Joyeux entitled "Hydrostatic Transmission Servo-Mechanism" assigned to the assignee, which copending application was filed on April 15, 1960, under Serial No. 22,605, now Patent No. 3,039,267. For purposes herein it is suffice to say that the one-way ram 35 is actuated by the fluid pressure in conduit 24 but the angular displacement of the unit 31 is not increased until the ram 35 has moved a sufficient distance allowed by the lost motion link 36. The purpose of the lost motion link 36 is to provide a time delay before the angular displacement of the unit 31 is changed from its minimum fluid displacement position responsive to increased fluid pressure in conduit 24.

The fluid discharge from the motor 25 is through the conduits 37 and 37a to the sump 14 as indicated in FIGURE 1.

The fluid power transmission from the motor port 17 for driving the wheel 30 has been described above. The means for driving the other wheel 30′ of the vehicle from the motor port 18 of the distributor valve 16 is identical with that described for driving the wheel 30 from fluid under pressure from the motor port 17. Since the corresponding components for driving the wheel 30′ are identical with that for driving the wheel 30 the corresponding components bear the same designation numerals except that each is primed. A description of the automatic fluid flow distributor valve 16 will now be made.

Referring to FIGURE 2 the distributor valve 16 is comprised of a housing 38 having a longitudinal bore 39 therethrough. The housing 38 is provided with an inlet compartment or chamber 40 in communication with an inlet port 41 and source of fluid pressure conduit 15. In one end portion of the valve 16 is a first compartment or chamber 42 communicatively connected to the first motor port 17. In the other portion of the distributor 16 is a second compartment or chamber 43 communicatively connected to the second motor port 18.

Slidable within the bore 39 is a valve element 44 best shown in FIGURE 2. The valve element 44 as best shown in FIGURES 3 and 4 is constructed from a cylindrical body by cutting, such as by milling, tapering grooves or channels 45 having a V-shaped cross-section as seen in FIGURES 3 and 4. These grooves 45 provide the means for lateral flow of fluid from the inlet 40 to the compartments or chambers 42 and 43 as best shown in FIGURE 2. It will be seen that when the valve element 44 is in the central position with respect to the inlet 40 the lateral flow of fluid under pressure to compartments 42 and 43 are equal. When the valve element 44 is shifted leftwardly as viewed in FIGURE 2 the flow of fluid into compartment 42 is increased and the flow into compartment 43 is correspondingly decreased. If the valve element is shifted rightwardly the reverse to that described above results. Suitable stop means (not shown) are provided for preventing movement of the valve element 44 to a position where fluid flow to either of the compartments is terminated.

Slidably disposed in each of the two end portions of the bore 39 are, respectively, thrust members 46 and 47 having outer flanges 48 and 49 respectively. The outer flange 48 is secured to one arm 23a of the bracket 23 as by bolts, two of which are shown at 50 and 51. Likewise the outer flange 49 is secured to the other arm 23b of the bracket as by bolts, two of which are shown at 52 and 53. From this it can be seen that when the steering column 20 is rotated the thread portion 21 moves the running nut 22 which in turn moves the bracket 23 and thrust members 46 and 47 in a lateral direction.

Seated on the inner surface 54 of the thrust member 46 is a calibrated compression spring 55 having its other end bearing upon the rightward end of the valve element 44 as viewed in FIGURE 2. Likewise seated on the inner surface 56 of the thrust member 47 is a calibrated compression spring 57 having its other end bearing upon the leftward end fo the valve element 44 as viewed in FIGURE 2. The springs 55 and 57 have compressive characteristics equal to each other for urging the valve element to a central position with respect to the surfaces 54 and 56. FIGURE 2 shows the valve element 44, bracket 23 and thrust members 46 and 47 in a central position. It will be apparent that if the steering column 20 is rotated the thrust members 46 and 47 will be shifted laterally which through springs 55 and 57 urges a corresponding lateral shift of the valve element 44. Now assuming for the moment that the bracket 23 is maintained in the stationary central position as shown in FIGURE 2, if the fluid pressure in the compartment 43 is greater than that in compartment 42, the differential pressure exerts piston action on the valve element 44 to shift it in a rightward direction which increases the flow of fluid from the inlet 40 to the compartment 43 while the flow into compartment 42 correspondingly decreases. Of course it is readily apparent that the reverse action takes place if the fluid pressure in compartment 42 becomes greater than that of compartment 43.

FIGURE 5 represents an alternative form of the fluid flow distributor 16. In this form the springs 55 and 57, the thrust members 46 and 47 and the bracket 23 are the same as that of FIGURE 2. In the form shown in FIGURE 2 the flow of fluid through compartments 42 and 43 is dynamic and the flow of fluid may influence the movement of the valve element 44. In the alternative form shown in FIGURES 1 and 5 the dynamic influence above described has substantially no effect on the movement of the valve plunger 58 in the housing 59. The housing 59 is provided with a longitudinal bore 60 as shown in FIGURE 5 and transverse ports 61 and 62 in communication with the conduits 24 and 24′, respectively, through branch conduits 24a and 24a′, respectively, as best shown in FIGURE 1. Thus the fluid pressures in spring compartments 63 and 64 are equal to that of conduits 24 and 24′ respectively. The motor ports 17 and 18 in the housing 59 are tapered, as shown in FIGURE 5, and communicates with the bore 60.

Referring now to FIGURES 6, 7 and 8 it will be seen that the valve plunger 58 slidable in the bore 60 is constructed from a cylindrical body by forming a bore 65 in a longitudinal direction and then cutting, as by milling operation, transverse slots 66, 67 and 68 as shown. The plunger 58 and housing 59 are provided with means, such as longitudinal keyways (not shown), for preventing axial rotation of the plunger 58 with respect to the housing 59.

so as to maintain registry as shown in FIGURE 5. Referring to FIGURE 5 the valving surfaces are the plunger surfaces 69 and 69' and the the surfaces of the motor ports 17 and 18 respectively. Thus as the plunger 58 moves leftwardly as viewed in FIGURE 5 the restriction of fluid flow between the inlet 41 and the motor port 17 decreases thus allowing more fluid under pressure to flow through the motor port 17. On the other hand the same movement of the plunger 58 correspondingly increases restriction with respect to port 18 thereby decreasing the fluid flow from the inlet 41 to the motor port 18. When, as in the case of the form shown in FIGURE 2, a differential pressure exists between the motor ports 17 and 18 the same differential pressure exists in the spring chambers 63 and 64 but the fluid in the spring chambers 63 and 64 is substantially static. The differential pressure in the spring chambers 63 and 64 results in differential piston acton on the surfaces 70 and 71 of the plunger 58 to urge the shift of the plunger in the appropriate direction. Since the respective internal end areas of each end of the plunger 58 are equal, the flow of fluid through the motor ports 17 and 18 do not substantially effect movement of the plunger 58.

The operation of the invention will now be described.

Assuming for the moment that the vehicle is progressing in a straight line employing constant engine speed and further that the vehicle is on level ground such as a highway. Thus the torque requirements on the wheels 30 and 30' (FIGURE 1) are equal. In this condition the angular displacement of the composite units 31 and 31' of the motors 25 and 25' will be equal. Likewise the fluid pressure in conduits 24 and 24' will be equal and the wheels 30 and 30' will rotate at equal speed. The movable valve members 44 or 58 of the fluid flow distributor 16 will be centrally located thus feeding the motor ports 17 and 18 at equal volume of fluid such as hydraulic oil. Thus the speed and torque requirements of the wheels 30 and 30' are equal. Now suppose the operator drives the vehicle in soft rough ground, also in a straight line insofar as steering is concerned. Further suppose the wheel 30' engages muck, mire or perhaps ice such that the torque requirement of the wheel 30' is greatly reduced. As a consequence the torque requirement on the wheel 30 will increase because of the difference in traction between wheels 30 and 30'. The increased load on wheel 30 increases the resistance to rotation of the motor 25 while at the same time the resistance to rotation of the motor 25' is reduced. Thus at this point if the volumetric flow of fluid in the conduits 24 and 24' remains the same, the wheel 30' would increase its speed and the wheel 30 would correspondingly decrease in speed.

The increased load on the wheel 30 increases the resistance to fluid flow between the conduit 24 and discharge conduit 37 through the motor 25. The increased resistance of fluid flow through the motor 25 results in increased pressure in conduit 24 while that in conduit 24' is correspondingly decreased. This creates a differential fluid pressure between motor ports 17 and 18 of the distributor valve 16. At the same time the servo-mechanism 34 is actuated by the increased pressure in a direction to increase the piston stroke of the motor 25 and the servo-mechanism 34' retracts in the direction to decrease the piston stroke of motor 25'. Thus the fluid displacement of motor 25 is increased while that of motor 25' is correspondingly decreased.

The above described increased torque requirement of the wheel 30 and associated fluid motor 25 and the decrease in torque requirement of wheel 30' and motor 25' creates a differential fluid pressure between motor port 17 and motor port 18 of the distributor 16. In the present change the pressure in the spring chamber 63 is greater than that in the spring chamber 64 thus shifting the plunger 58 leftwardly as viewed in FIGURE 5. The leftward shift of plunger 58 allows a correspondingly greater amount of fluid to pass from inlet 41 to motor port 17 and decrease the flow to motor port 18. The increased fluid flow to the motor port 17 compensates for the increased demand for fluid under pressure by the motor 25 occasioned by the increased displacement of the motor 25 and torque-load requirement of the wheel 30 as above explained. The increased availability of fluid under pressure now maintains the speed of the motor 25 even though higher torque delivery is required. On the other hand the motor 25' being under reduced torque load has a correspondingly reduced availability of fluid under pressure but the displacement of the motor 25' is also compensatingly reduced and thus the wheel 30' maintains its speed equal to that of wheel 30.

From the above it can be seen that by proper selection of characteristics of springs 55 and 57 as well as the size of the components of the distributor 16 in relation to the two fluid motors 25 and 25' and their associated servo-mechanisms 34 and 34' the speed of the wheels 30 and 30' will be equal if the delivery of pump 12 remains constant. Of course it should be understood that the speed of the wheels 30 and 30' will vary if the sum of the torque requirements of the wheels 30 and 30' varies but the speed of wheel 30 will always be equal to wheel 30'.

Now in the event that the operator desires to steer the vehicle to the right or left direction it is desirable to vary the speed of wheel 30 with respect to wheel 30' in order to assist steering movement. For example, if the vehicle of FIGURE 1 is steered in a rightward direction it is desirable that the wheel 30 slow down and the wheel 30' speed up. Operation of the steering wheel 20a moves the running nut 22 and associated bracket 23 rightwardly as viewed in FIGURE 1 (leftwardly as viewed in FIGURE 5). This movement shifts the plunger 58 of the distributor valve 16 in the same direction as the bracket 23 which increases the flow of fluid under pressure in motor port 18 and correspondingly decreases flow into motor port 17 thereby increasing the speed of wheel 30' and correspondingly decreasing the speed of wheel 30. However, for a given shift of the bracket 23 the relation of the speed of one wheel 30 with respect to wheel 30' becomes a substantially fixed ratio. Therefore for a given vehicle the threads 21 on the steering column 20 and the threads of the running nut 22 of the bracket 23 should be selected such that the distributor valve 16 will function to attain proper speed ratio corresponding to the vehicle's turning movement as otherwise the torque requirement on the slower wheel will rise and the rise in torque actuates the associated servo-mechanism to compensate therefor and slippage of the slower wheel on the ground will occur.

At this point it should become apparent that the fluid motor 25 and 25' need not be of the variable displacement type as illustrated in the drawings for they can be of the constant displacement type. However the sensitivity of the present embodiments is greater with reference to variations in torque requirements for each of the two motors but the principle of operation and function of the distributor 16 remains the same irrespective of the type of the two fluid motors employed.

Obviously the concept of the present invention is not necessarily limited to a transmission means for self-propelled vehicles but the transmission system can be employed to any machine or application requiring the speed of two motors be equalized where the separate motors are subjected to varying torque conditions or where the speed of one motor in relation to the other motor is of predetermined selected ratio.

Having thus described preferred embodiments of the invention it can now be seen that the objects of the invention have been fully achieved and it must be understood that changes and modifications may be made which do not depart from the spirit of the invention nor from the scope thereof as defined in the appended claim.

What is claimed is:

A fluid flow distributor for a hydrostatic transmission comprising a housing having a longitudinal bore, an inlet port connectable to a source of fluid pressure and communicating with said bore, first and second motor ports disposed in said housing connected separately to said bore, a movable valve member disposed in said bore, said valve member being adapted to communicate said inlet port with said motor ports simultaneously, shiftable resilient means in said distributor positioned to urge said valve member toward a predetermined position for selectively determining the ratio of fluid flow to one of said motor ports with respect to the other said motor port when fluid pressure in said motor ports are equal, said valve member being movable responsive to a fluid pressure differential between said motor ports for increasing flow of fluid to one of said motor ports having the higher fluid pressure and correspondingly decreasing flow of fluid to the other motor port having the lower fluid pressure proportionately to the magnitude of said fluid pressure.

References Cited by the Examiner
UNITED STATES PATENTS

| | | | |
|---|---|---|---|
| 1,176,307 | 3/16 | Manly | 180—6.3 |
| 1,424,823 | 8/22 | Ingoldby | 60—53 X |
| 2,161,439 | 6/39 | Thoma | 60—53 |
| 2,257,108 | 9/41 | Cornwell | 180—6.48 |
| 2,516,662 | 7/50 | Vickers et al. | 60—53 X |
| 2,643,664 | 6/53 | Willett | 137—101 |
| 2,859,762 | 11/58 | Banker | 137—101 |
| 2,910,085 | 10/59 | Banker | 137—101 |
| 2,941,365 | 6/60 | Carlson et al. | 60—53 X |
| 2,942,421 | 6/60 | Hann et al. | 60—53 X |
| 3,039,268 | 6/62 | Shaffer | 60—53 |

A. HARRY LEVY, *Primary Examiner.*

WILLIAM J. KANOF, PHILIP ARNOLD, *Examiners.*